US011200414B2

(12) United States Patent
Brown et al.

(10) Patent No.: US 11,200,414 B2
(45) Date of Patent: Dec. 14, 2021

(54) PROCESS FOR CAPTURING CONTENT FROM A DOCUMENT

(71) Applicant: Idemia Identity & Security USA LLC, Billerica, MA (US)

(72) Inventors: Timothy J. Brown, Tampa, FL (US); Joseph R. Mayer, Passaic County, NJ (US); Mike DiNicola, Malden, MA (US); Brian Martin, Sudbury, MA (US)

(73) Assignee: Idemia Identity & Security USA LLC, Billerica, MA (US)

( * ) Notice: Subject to any disclaimer, the term of this patent is extended or adjusted under 35 U.S.C. 154(b) by 188 days.

(21) Appl. No.: 16/235,298

(22) Filed: Dec. 28, 2018

(65) Prior Publication Data

US 2019/0205635 A1 Jul. 4, 2019

Related U.S. Application Data

(60) Provisional application No. 62/612,368, filed on Dec. 30, 2017.

(51) Int. Cl.
*G06K 9/00* (2006.01)
*G06F 1/16* (2006.01)
*H04N 1/00* (2006.01)
*G06F 3/0346* (2013.01)
(Continued)

(52) U.S. Cl.
CPC ....... *G06K 9/00456* (2013.01); *G06F 1/1626* (2013.01); *G06F 1/1686* (2013.01);
(Continued)

(58) Field of Classification Search
CPC ............ G06K 9/00456; G06K 9/00463; G06F 1/1626; G06F 1/1686; G06F 1/1694; G06F 3/0346; H04N 1/00005
(Continued)

(56) References Cited

U.S. PATENT DOCUMENTS 9,386,235 B2 * 7/2016 Ma .................... G06K 9/00751
10,474,890 B2 * 11/2019 Hassanzadeh ........... G06K 9/66
(Continued)

OTHER PUBLICATIONS

PCT International Preliminary Report on Patentability and Written Opinion in International Application No. PCT/US2018/067955, dated Jul. 9, 2020, 7 pages.
(Continued)

*Primary Examiner* — Jonathan S Lee
(74) *Attorney, Agent, or Firm* — Fish & Richardson P.C.

(57) ABSTRACT

Methods, systems, and apparatus, including computer programs encoded on a computer storage medium, for a data capture application of a computing device that receives image data for an image of a document and uses the image data to capture content on the document while minimizing glare at the document. The data capture application receives user input for positioning an image token provided for display to a user of the data capture application. Positioning the image token causes adjustment of an attribute value of the image data. In response to receiving the user input the data capture application determines whether the attribute value of the image data satisfies a predefined attribute value. Based on the attribute value satisfying the predefined attribute value, the data capture application generates a composite image of the document using the image data received by the data capture application.

23 Claims, 9 Drawing Sheets

(51) Int. Cl.
 G06F 3/03 (2006.01)
 G06F 3/00 (2006.01)
(52) U.S. Cl.
 CPC ............ *G06F 1/1694* (2013.01); *G06F 3/005* (2013.01); *G06F 3/0304* (2013.01); *G06F 3/0346* (2013.01); *G06K 9/00463* (2013.01); *H04N 1/00005* (2013.01)
(58) Field of Classification Search
 USPC ........................................................ 382/176
 See application file for complete search history.

(56) References Cited

U.S. PATENT DOCUMENTS 10,943,107 B2 * 3/2021 Hassanzadeh ..... G06K 9/00463
2015/0324390 A1 * 11/2015 Macciola ............. G06K 9/3275
  707/769
2016/0006894 A1 7/2016 Showering et al.
2016/0309085 A1 * 10/2016 Ilic .......................... G06T 11/60
2017/0109830 A1 * 4/2017 Macciola .................. G06T 7/12
2017/0344821 A1 11/2017 Gaskill et al.

OTHER PUBLICATIONS

Ai.googleblog.com [online], "PhotoScan: Taking Glare-Free Pictures of Pictures," Apr. 2017, [retrieved on Jul. 2, 2019], retrieved from: URL<https://ai.googleblog.com/2017/04/photoscan-taking-glare-free-pictures-of.html>, 9 pages.
PCT International Search Report and Written Opinion in International Appln. No. PCT/US2018/067955, dated Apr. 3, 2019, 12 pages.

* cited by examiner

PROCESS FOR CAPTURING CONTENT FROM A DOCUMENT

FIELD

This specification relates to capturing content from identification documents.

BACKGROUND

Mobile computing devices such as smartphones and tablets can be used to capture digital images and video content of an identification card or document. The captured image or video content may be used to validate the authenticity of the card. Authenticity checks may require that relevant information on the identification be photographed with minimal glare, shadows, or other obscurities can distort representations depicted in the captured image content. In some instances, challenges with image glare and shadow correction can be overcome by having a user adjust a viewing angle of the capture device. However, relying on subjective user-defined adjustments of viewing angles do not produce the necessary corrections for generating high quality image captures. In addition, user-defined adjustments can lead to multiple failed attempts at generating a quality image capture, thereby frustrating the user and causing device resources to perform extraneous processor and memory operations.

SUMMARY

This specification describes methods, systems, and apparatus, including computer programs encoded on a computer storage medium, for a data capture application that enables an image of a document to be captured with minimal distortion from glare, shadow, or other related image properties that may distort or obscure information contained on the document. The data capture application receives image data for an image of the document and receives user input for positioning an image token provided for display to a user of the data capture application. Positioning the image token causes adjustment of an attribute value of the image data. In response to receiving the user input the data capture application determines whether the attribute value of the image data satisfies a predefined attribute value. Based on the attribute value satisfying the predefined attribute value, the data capture application generates a composite image of the document using the image data received by the data capture application.

One aspect of the subject matter described in this specification can be embodied in a computer-implemented method. The method includes: receiving, by a data capture application of a computing device, image data for an image of a document; receiving, by the data capture application, user input to position an image token displayed at the computing device, wherein positioning the image token causes adjustment of an attribute value of the image data; in response to receiving the user input, determining, by the data capture application, whether the attribute value of the image data satisfies a predefined attribute value; and based on the attribute value satisfying the predefined attribute value, generating, by the data capture application, a composite image of the document using the image data received by the data capture application.

These and other implementations can each optionally include one or more of the following features. For example, in some implementations, the method further includes: generating, by the data capture application, a notification that includes an instruction to position the image token at a particular location of a display of the computing device; and providing, by the data capture application, the notification as a display output to a user of the data capture application to cause the user to position the image token at the particular location.

In some implementations, the method further includes: generating, by the data capture application, a predefined capture border provided as a display output to the user of the data capture application and that is operable to cause the user to orient the computing device to position a representation of the document displayed at the computing device within the predefined capture border; determining, by the data capture application, whether the representation of the document is within the predefined capture border; and in response to determining that the representation of the document is within the predefined capture border, providing the notification as the display output.

In some implementations, determining whether the representation of the document is within the predefined capture border includes one of: causing, by the data capture application, the predefined capture border to have a first characteristic in response to determining that the representation of the document is within the predefined capture border; or causing, by the data capture application, the predefined capture border to have a second different characteristic in response to determining that the representation of the document is not within the predefined capture border.

In some implementations, the notification includes information to: i) cause the user to adjust an orientation of the computing device; or ii) cause the user to adjust a tilt angle of the computing device. In some implementations, the image token is a first image overlay feature of the data capture application; and the image token is operable to move over the image of the document when the image of the document is provided for display at the computing device.

In some implementations, the method further includes: generating, by a target generator of the device capture application, an image target that is provided as a display output to the user of the data capture application, wherein the image target is randomly generated over a predefined time period. In some implementations, the user input causes the image token to align with the image target generated by the data capture application; and the image target is a second image overlay feature of the data capture application. In some implementations, the method further includes: adjusting, by the data capture application, the attribute value of the image data based on user input indicating the image token was positioned to align with the image target.

In some implementations, the attribute value of the image data corresponds to at least one of multiple image attributes that are descriptive of the image of the document. In some implementations, the attribute value of the image data describes at least one of: i) a glare attribute of the image; ii) a clarity attribute of the image; iii) a shadow attribute of the image; or iv) a distance attribute of the image.

Other implementations of this and other aspects include corresponding systems, apparatus, and computer programs, configured to perform the actions of the methods, encoded on computer storage devices. A computing system of one or more computers or hardware circuits can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The subject matter described in this specification can be implemented to realize one or more of the following advantages. Through the use of interactive gamification techniques, coupled with technology for capturing multiple digital images photos, a composite image of an identification document can be generated having image data that is within desired ranges for glare and shadow properties. During a capture process, an application program analyzes image data to compute success rates for capturing high quality images and uses gaming techniques to prompt a user to correct error conditions associated with capture problem areas.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This document describes specific computing rules for generating a high quality composite image based on a series of digital images that are captured during an image capture process. The images are considered to be high quality images because they include representations that show minimal image distortion from glare, shadows, or other obscurities. The computing rules can include gamification techniques that are coupled with technology for capturing a series of digital images to generate a composite image of an identification (ID) document. In some implementations, the described techniques can be used to provide an image capture process that is both engaging and entertaining to a user. For example, the described gamification techniques can provide an engaging user experience that prompts a user to take certain actions to capture image data in a single capture experience. The captured image data exhibits minimal glare or shadow attributes and, thus, can be used to generate a high quality composite image.

Figure 1:
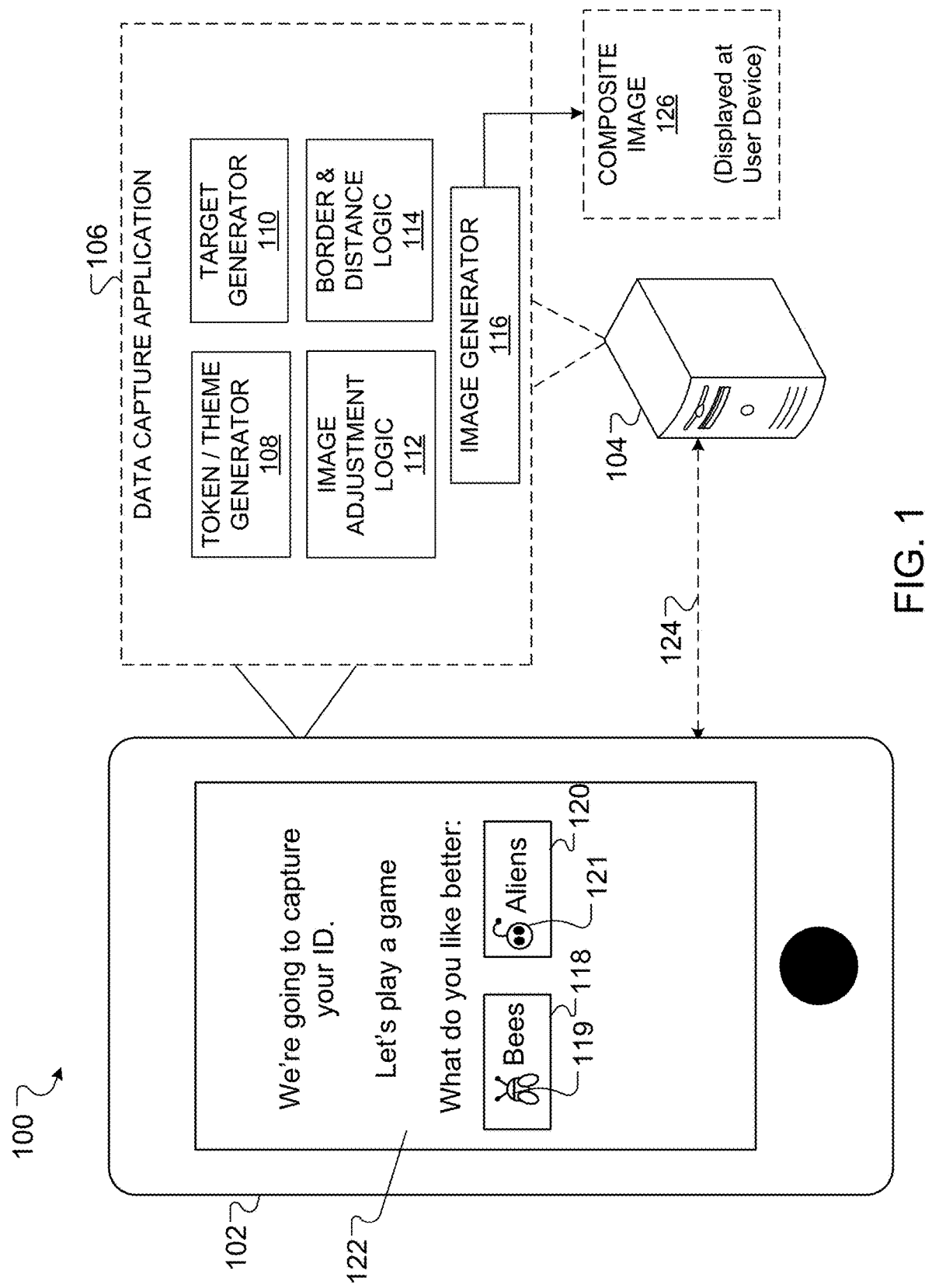
FIG. 1 shows a block diagram of a computing system including at least one computing device and a data capture application for generating a composite image of a document.

FIG. 1 shows a block diagram of a computing system 100 including at least one computing device and a data capture application for generating a composite image of a document. System 100 generally includes a user device 102, a computing server 104, and a data capture application 106 that includes multiple computing modules. User device 102 can be one of multiple computing devices that are configured to receive image data from an image capture device. In some implementations, the image capture device is a camera (e.g., a digital camera) that is included in, or integrated with, the computing device, or is separate from the computing device. For example, user device 102 can be a smartphone, a laptop computer, a tablet device, a mobile computing device, a desktop computer, or any other related computing device that receives and processes image data.

User device 102 and computing server 104 are each configured to access data capture application 106 and each of the computing modules of application 106. In some implementations, application 106 is included within server 104 as a sub-system of hardware circuits that include one or more processor microchips. In other implementations, application 106 is an executable computer program that is stored in memory at user device 102. In general, application 106 is accessed and launched at user device 102. In some implementations, functions of application 106 described in this document are enabled, implemented, or executed based on user device 102 exchanging data communications 124 with server 104.

User device 102 and server 104 each can include one or more processors, memory, and data storage devices that collectively form one or more computing sub-systems of system 100. Processors of the respective computing sub-systems process instructions for execution by user device 102 or server 104, including instructions stored in the memory or on the storage device to display graphical information for a graphical user interface (GUI) at a display 122 of user device 102.

Execution of the stored instructions can cause one or more of the actions described herein to be performed by user device 102 or server 104. In other implementations, multiple processors may be used, as appropriate, along with multiple memories and types of memory. For example, server 104 may be connected with multiple other computing devices, with each device (e.g., a server bank, groups of servers, modules, or a multi-processor system) performing portions of the actions or operations associated with the various processes or logical flows described in this specification.

Application 106 can include data modules. One or more data modules can be configured to execute programmed instructions and computing logic for processing image data and for generating multiple gaming features, such as tokens and targets. As used in this specification, the term "module" is intended to include, but is not limited to, one or more computers configured to execute one or more software programs that include program code that causes a processing unit(s)/device(s) of the computer to execute one or more functions. The term "computer" is intended to include any data processing or computing devices/systems, such as a desktop computer, a laptop computer, a mainframe computer, a personal digital assistant, a server, a handheld device, a smartphone, a tablet computer, an electronic reader, or any other electronic device able to process data.

In some implementations, application 106 is associated with an example workflow used by a business entity or identity authority to receive or obtain personal information about a person. Computing functions enabled by application 106 can be including in a workflow process for obtaining identity information about an individual. For example, a public or private business entity may require the identity information to validate the identity of a person seeking to make a particular commercial transaction. During the workflow, application 106, and data content of the application, can be presented for display to a user as an interactive image capture "game." For example, when application 106 is launched or executed during the workflow, a user may be presented with text at display 122 stating "we're going to capture your ID. Let's play a game."

One or more gaming tokens are associated with the interactive gamification techniques described in this document. When application 106 is used to capture an image of an ID card/document, representations of the gaming tokens are provided for output at display 122. Example gaming tokens can include at least a "bee" token and an "alien" token. In some implementations, a variety of different gaming tokens can be selected based on a desired gaming theme that is available for selection by a user of application 106. For example, application 106 can provide users with an option to select a bee gaming theme 118, where a digital bee token 119 pollinates digital flowers, or an alien/spaceship gaming theme 120, where a digital alien token 121 is beamed up to a digital spaceship. In general, application 106 can be an interactive computer-implemented game that prompts users to move bee token 119 or alien token 121 over a series of targets by tilting, rotating, or otherwise adjusting an orientation of user device 102.

Application 106 is configured to assist users with correcting one or more error conditions relating to image pixel saturation (e.g., caused by glare) and or other types of conditions that may exist when capturing an image of an ID document. Hence, application 106 can be used to improve the likelihood that a high quality image is generated during the workflow. Gamification techniques of application 106 are configured to cause a user to tilt/move user device 102 in a manner that corrects for glare and shadows and to allow for capturing of certain required information from an ID card.

Application 106 includes a token/theme generator 108, a target generator 110, image adjustment logic 112, border & distance logic 114, and an image generator 116. Token generator 108 is a computing module configured to generate an image token. Application 106 uses token generator 108 to generate one or more tokens 119, 121 for output at display 122. For example, token/theme generator 108 can generate different graphical representations of various data items or visual constructs based on a gaming theme selected by a user.

Target generator 110 is a computing module configured to generate multiple different targets (described below). Application 106 uses target generator 110 to generate one or more targets for output at display 122. For example, target generator 108 can generate different graphical representations of various data items or visual constructs based on a gaming theme selected by a user. In some implementations, application 106 embodies an interactive data capture game that has randomized gaming components to prevent fraudsters from using the data capture game to spoof or falsify an ID document. For example, target generator 110 can be configured to randomly generate the location of targets within display 122 and randomly generate the order in which targets are displayed. In some implementations, a length of the data capture game is variable or randomly determined and is not directly related to the success of the image capture process. A length of the data capture game may correspond to a length of time or a number of generated targets that needs to be captured or collected.

Image adjustment logic 112 is used by application 106 to adjust image data for an image captured using a digital camera. The image data can include image pixel values that are indicative of a glare property or attribute of a digital image. In some implementations, logic 112 is used to adjust image pixel values to correct one or more error conditions. For example, the error conditions can relate to glare or shadow properties of the ID document being photographed. Certain glare attributes of items or environments being photographed can cause image pixels to oversaturate and distort or blur representations of items in an image. Application 106 can analyze image pixel values (e.g., attribute values) and compare the pixel attribute values to one or more threshold attribute values to determine pixel saturation.

In some implementations, application 106 determines error conditions based on pixel attribute values that indicate pixel oversaturation. For example, application 106 can detect an error condition caused by oversaturated pixels based on pixel attribute values exceeding predefined threshold values. Logic 112 can be used to adjust image pixel values of the image data to correct error conditions in response to user input provided at user device 102. Image data properties determined or measured using attribute values can include image glare, image reflections, image background variation, or image shape. In some implementations, the oversaturated pixels are caused by either excessive glare, shadow, or other significant increases or decreases in image data attributes.

Border & distance logic 114 can be used by application 106 to determine or compute the distance between user device 102 (e.g., the capture device) and an object being imaged (e.g., an ID document). Logic 114 can also be used by application 106 to detect or determine a border or periphery of an ID document being imaged. In addition, logic 114 can compute or determine a capture field for capturing a digital image of the ID document. The capture field can be determined based on borders or peripheries of the ID document. In some implementations, logic 114 is used to generate a digital border.

A visual representation of the digital border generated by logic 114 can be provided for output, e.g., as a display output, at user device 102 via display 122. The digital border can represent a target area that defines where the ID document should be positioned when user device 102 is used to capture a digital image of the document. In some implementations, logic 114 is configured to adjust a characteristic of the border when the ID document is not positioned within a target area, such as predefined digital capture border that defines an area where a representation of the ID document should be positioned. In some cases, logic 114 is operable to adjust a color characteristic of the digital border or a line characteristic of the digital border.

For example, application 106 can use logic 114 to: i) generate a red border when the ID card (e.g., a representation of the ID card/document) is not properly positioned within the digital border; ii) change the color of the digital border from red to green when the ID card transitions from not being properly positioned within the digital border to being properly positioned within the border; and iii) change the color of the digital border from green to red when the ID card transitions from being properly positioned within the digital border to not being properly positioned within the border. Logic 114 can be configured to use various other colors to adjust the digital border and to indicate whether the ID card is properly positioned within the border.

Application 106 determines that an ID card is properly positioned within a digital border when the ID card is determined to be located within a threshold distance from user device 102 (or a capture device). Alternatively, or in addition, logic 114 can use dashed lines, variations in line weight/thickness, or combinations of each to indicate whether an ID card is within the digital border. In some implementations, logic 114 can be used to generate a predefined capture border 122 that is provided as a display output to a user of the data capture application. The predefined capture border 122 is operable to cause the user to orient the user device 102 to position a representation of the document displayed at the user device within the predefined capture border 122.

Image generator 116 generates multiple images using image data for capturing images of an ID card/document. In some implementations, the image data for capturing images of an ID card is produced using an image sensor of a camera/capture device associated with user device 102. Image generator 116 can generate multiple images and use at least a subset of the multiple images to generate a composite image.

Referring now to an example operation, application 106 can use pixel attribute values and/or indications of oversaturated pixels to determine an area of an image that has an error condition related to excessive glare and, thus, requires glare correction. Target generator 110 can use parameter values that identify image areas requiring glare correction to generate one or more targets for output at display 122. The target(s) is generated and displayed at specific areas of an image rendering to cause user correction of the error condition related to excessive glare. For example, the target is generated and shown to the user at position/area (x,y) of display 122. The user causes bee token 119 to move to position (x,y) of display 122 so that bee token 119 is aligned with the target.

A digital border is shown at display 122 to indicate that the ID document should be positioned within the digital border when capturing a digital image of the ID document. The movement of token 119 to align with the target causes tilting or orienting of user device 102. The tilting or orienting of user device 102 causes error conditions relating to glare, shadows, reflections, or other image data attributes to be corrected due to the repositioning of user device 102 relative to a capture environment. Image generator 114 generates multiple images of the ID document when application 106 determines that image data properties/attributes are within predefined ranges for certain attribute values. The multiple images are used to generate a composite image 126 for use in validating the identity of a user or validating/verifying authenticity of an ID document. In some implementations, composite image 126 is provided for output at display 122 for viewing by the user.

Figure 2A:
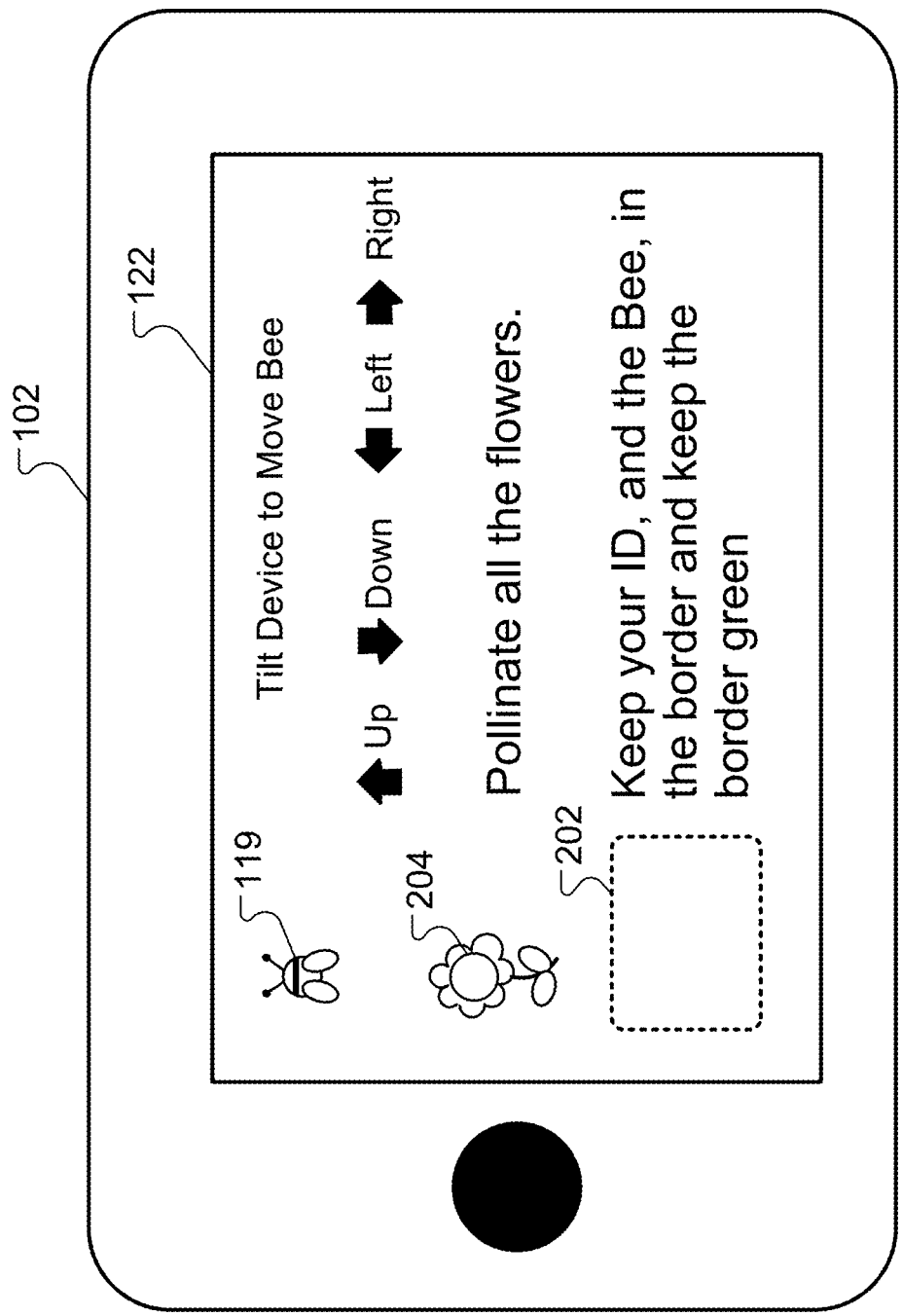
FIGS. 2A-2C each show a computing device displaying image data for generating the composite image of the document.

FIG. 2A shows user device 102 displaying information about using the data capture application 106 to capture image data for generating the composite image 126 of an ID document. As part of an example workflow, application 106 can be configured to provide instructions for interacting with an example interactive gaming interface generated by application 106. For example, based on instructions presented via display 122, a user can be directed to move bee token 119 to collect certain targets 204 (e.g., digital flowers that require pollination). The instructions can also identify a digital border 202 and indicate to the user that the ID document should be kept within the border 202 (e.g., a prescribed target area). As described above, logic 114 is used to generate a predefined capture border 122 that causes a user to position a representation of a document within the predefined capture border 122 by orienting the user device 102.

Figure 2B:
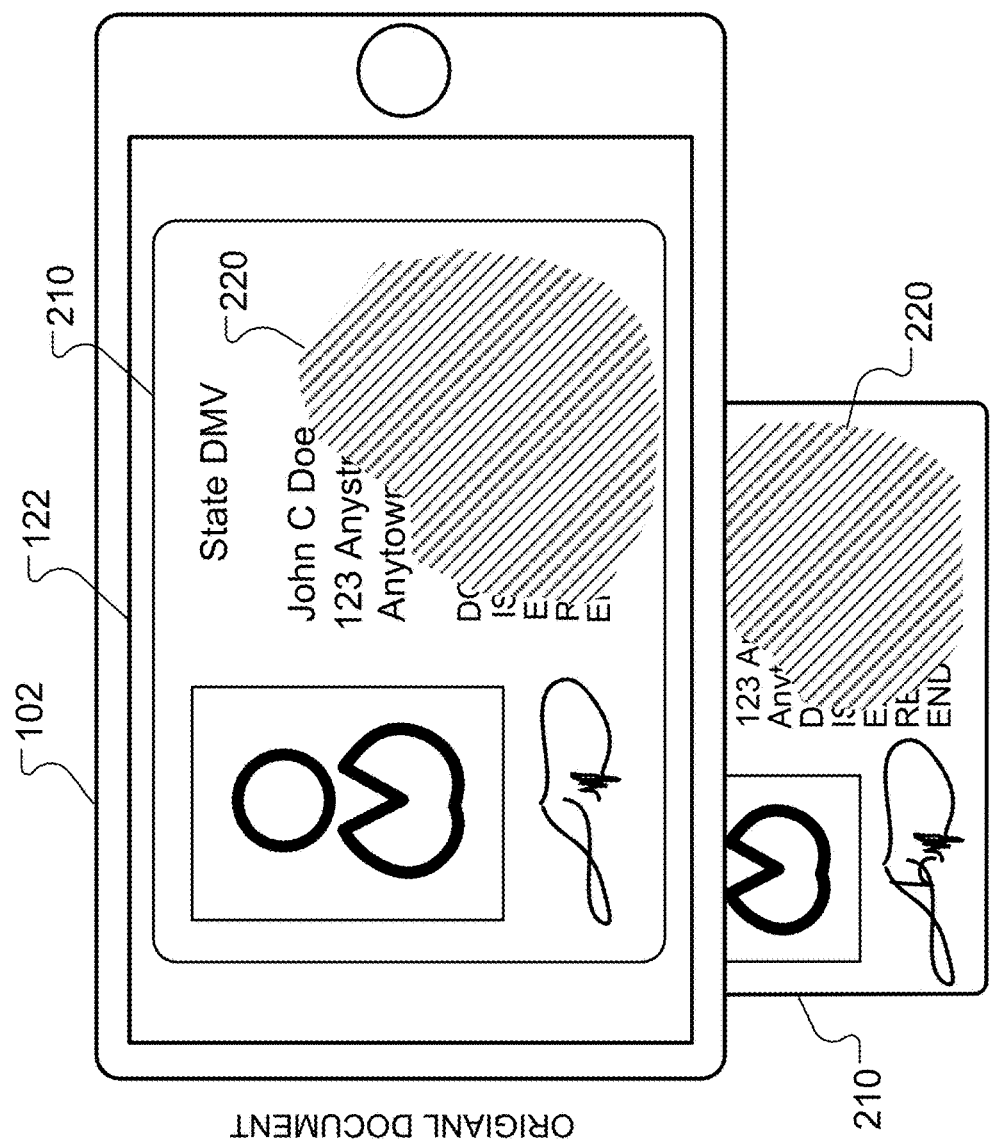
Figure 2B:
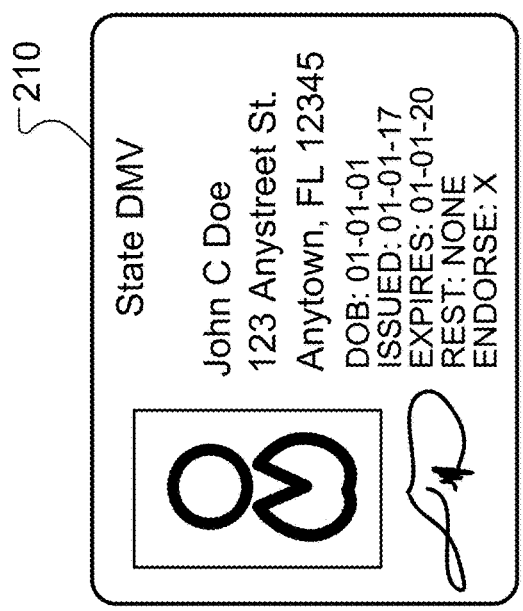
Figure 2C:
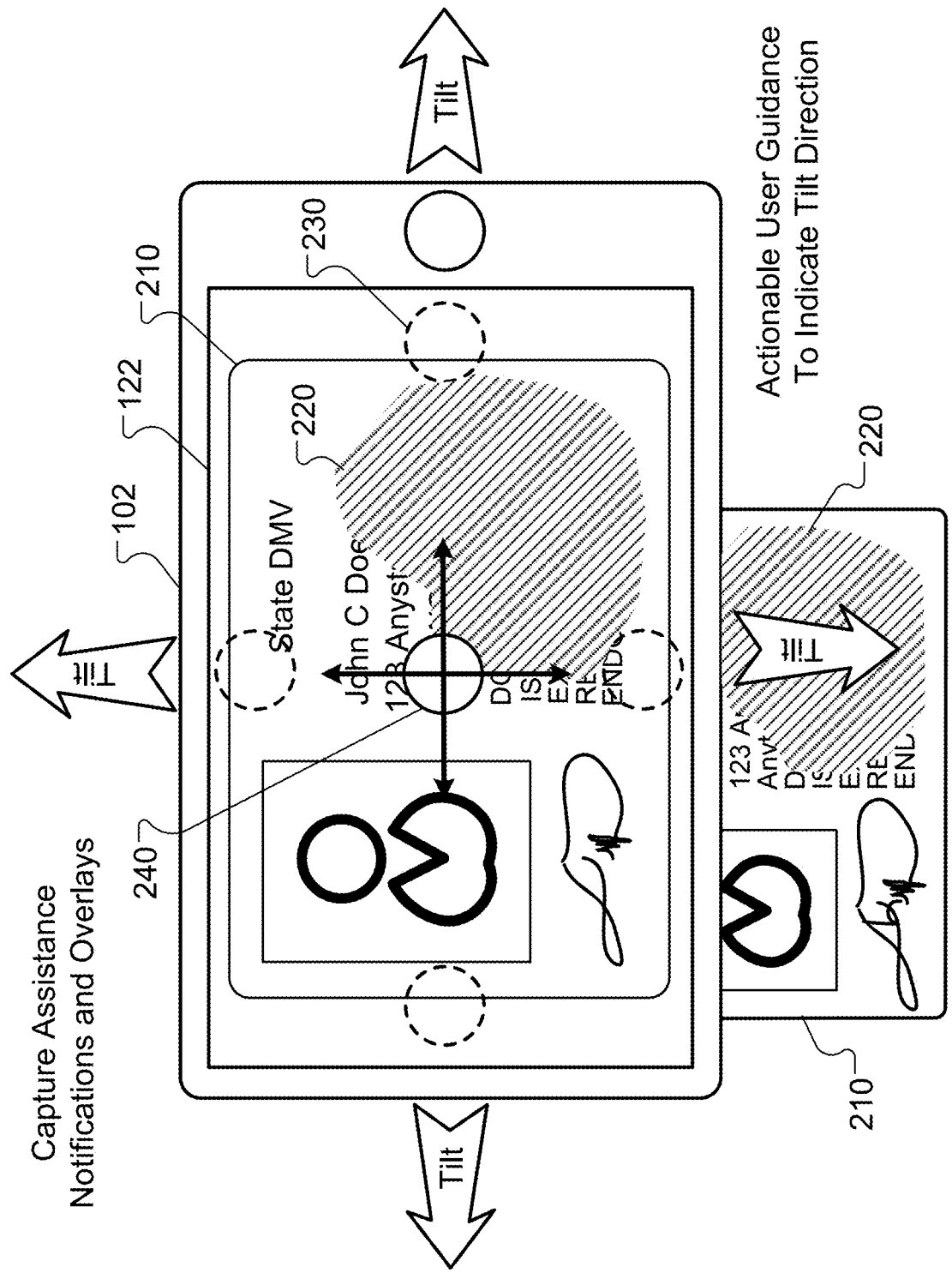

FIGS. 2B and 2C each show an example document 210 and user device 102 displaying information for generating a composite image 126 of document 210. Document 210 can be a driver's license card and user device 102 may use a camera application of the device to display a digital image that includes a representation of the document 210. As shown in at least the implementation of FIG. 2B, the image including the representation of the document 210 is provided as a display output at a display screen of the user device 102. In some instances, an image attribute 220 may be visible in the image or the representation of the document 210.

The image attribute 220 may be descriptive of particular attribute or property of the document. For example, the image attribute 220 may describe or indicate glare, reflections, background variations, or a shape of the document 210. Hence, image attribute 220 can represent glare, reflections, or shadows caused by light interacting with a surface of the document 210. The card capture application 106 can use a particular attribute value (e.g., pixel values) to represent image attribute 220. In some cases, image attribute 220 can distort, obscure, conceal, or otherwise block information in an image of the document 210.

In this context, techniques are described for reducing or removing the information distorting effects of glare, reflections, or other attributes of document 210 that may be represented by image attribute 220. In some implementations, application 106 provides a particular type of user experience at device 102 that uses generated notifications to instruct a user to orient the device 102 so as to reduce or eliminate image attribute 220. The user experience is coupled with programmed instructions for performing multiple image registration, including image stitching, multiple image processing, and information recognition/identification.

When a document 210 contains glare indicated by attribute 220, application 106 remedies the glare condition by displaying notifications to cause a response from the user. For example, the displayed notifications can instruct the user to reposition a camera of device 102. The camera can be repositioned in such a way that reduces the effect of an incoming light source that causes the glare, reflections, or other properties indicated by attribute 220. In some implementations, this repositioning translates to a tilting of the camera or user device 102. Hence, the described techniques can be used to provide actionable user guidance based on notifications that are displayed in a user interface (UI) of device 102 and that encourages the tilting or orienting of the camera or user device.

Referring now to FIG. 2B, during a live image capture of document 210, the application 106 determines that glare, indicated by image attribute 220, is present on the document 210. In some implementations, application 106 uses logic 112 to determine a location of the glare. Depending on the determined location of the glare, user interface of application 106 causes one or more targets 230 to be displayed as a visual output to the user. In some cases, application 106 uses target generator 110 to generate a respective target 230 at one of four cardinal locations at the display screen 122. For example, a respective target 230 can be displayed at a top of the display screen (North location), at a bottom of the display screen (South location), at a right side of the display screen (East location), at a left side of the display screen (West location). In some instances, the targets 230 shown in the UI may be generated at various other locations of the display 122.

In some implementations, a "ball" or "bubble" token 240 is generated for display in the UI at a location that corresponds to the middle of the display screen 122. In this manner, application 106 generates a notifications that includes an instruction to position the token 240 at a particular location, e.g., North, South, East, etc., of display 122 of the user device 102. The application 106 provides the notification as a display output to the user of the data capture application 106 to cause the user to position the image token 240 at the particular location. Hence, the user is encouraged to tilt the user device 102 in the direction of the circular targets 230 to "roll" the ball token 240 into alignment with the circular targets 230. The tilting action causes reorientation of the camera and user device 102 which reduces or eliminates the glare indicated by attribute 220. In some implementations, while this action is occurring, a camera integrated at device 102 captures multiple images of the document 210. In some cases, this process can be repeated with one or more of the other 3 locations or greater than four locations.

FIGS. 3A-3E each show a computing device (e.g., user device 102) displaying information about using data capture application 106 to capture image data for generating composite image 126 of an ID document. In some implementations, collecting certain targets 204 involves moving (line 307) bee token 119 so that token 119 is aligned, or overlaps, with a target 204. At FIG. 3A, diagram 300 indicates that token 119 is moved to collect targets in response to tilting or re-orienting user device 102 relative to the ID document 302 being captured or in response to repositioning the ID card 302 relative to user device 102.

User device 102 causes a digital rendering of token 119 to be adjusted in response to tilt motions of user device 102. For instance, as shown, token 119 can be moved along line 307 toward target 204 in response to a first tilt motion 306 or in response to a second tilt motion 308. In some implementations, when a user tilts user device 102 to move token 119 to align with target 204, certain image data attributes (e.g., for glare, shadow, reflection, etc.) are adjusted to correct one or more error conditions associated with capturing an image. In other implementations, a user tilts user device 102 to cause ID document 302 to be positioned within capture/digital border 202. ID document 302 can include an image of a user or individual 304 that may be an owner of the ID card. After bee token 119 reaches, aligns with, or collects first target 204, the target 204 can disappear and a new target 204 can be generated and shown at display 122.

As a user tilts and alters the orientation of user device 102, token 119 can move in a corresponding direction. Such movement causes shadows, glare, reflections, or related environmental properties associated with ID card 302 to shift. Shifting of these properties allows device 102 to capture multiple high quality images of card 302, where the images appear clear and unaffected by excessive light glare or other related properties of a capture environment. In some implementations, a direction and speed of the token's movement is calculated using internal mechanisms of device 102 that are commonly used for mobile applications or application programs. Application 106 can be configured to track the success of multiple different images that are captured. In some implementations, application 106 determines whether a part of ID card 302 is obscured during an image capture process. Based on this determination, application 106 can generate a future target 204 for display at device 102 to ensure that the previously obscured area of card 302 is captured.

Figure 3A:
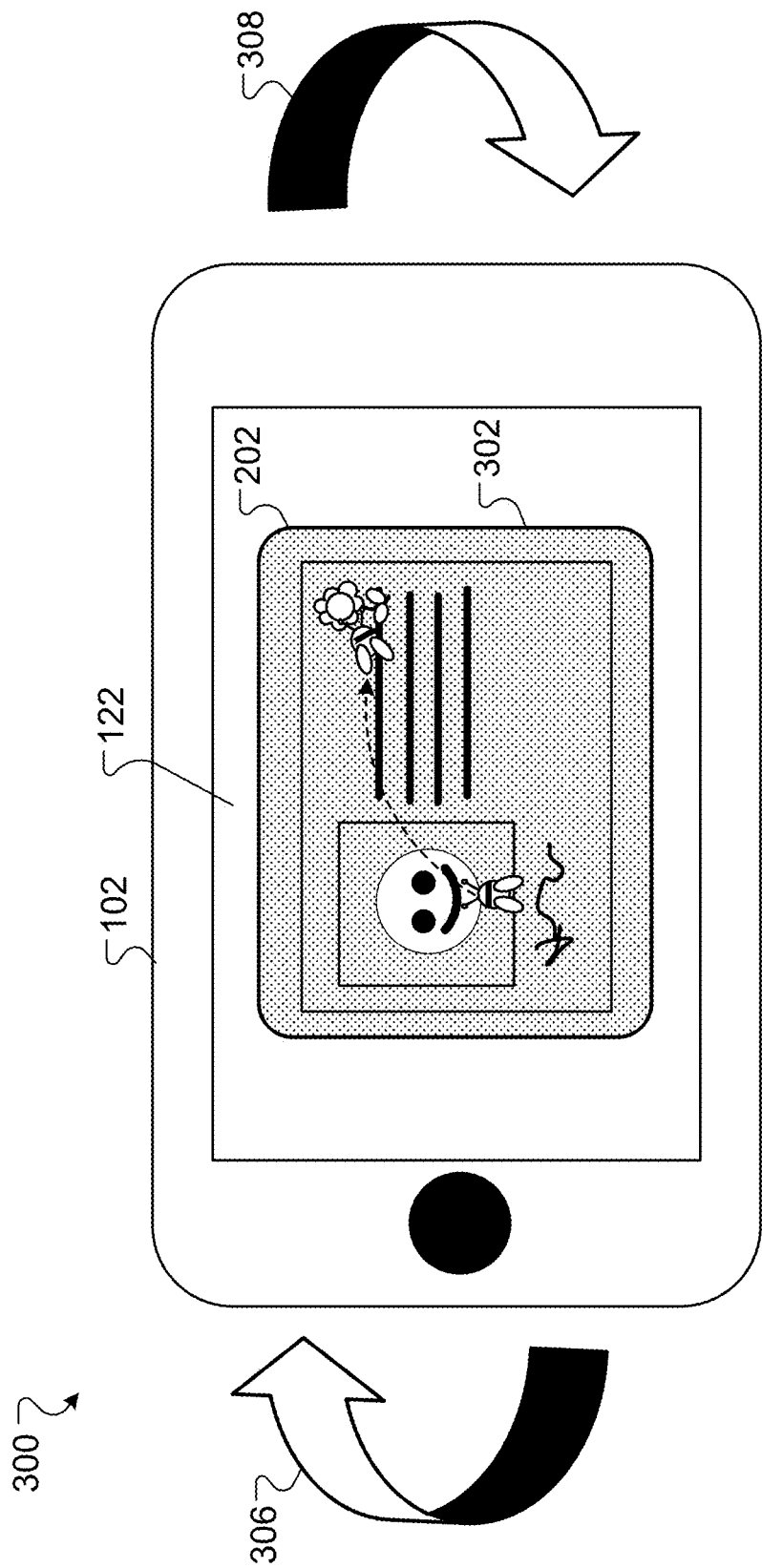
FIGS. 3A-3C each show a computing device displaying information associated with a capture application for generating the composite image of the document.
Figure 3B:
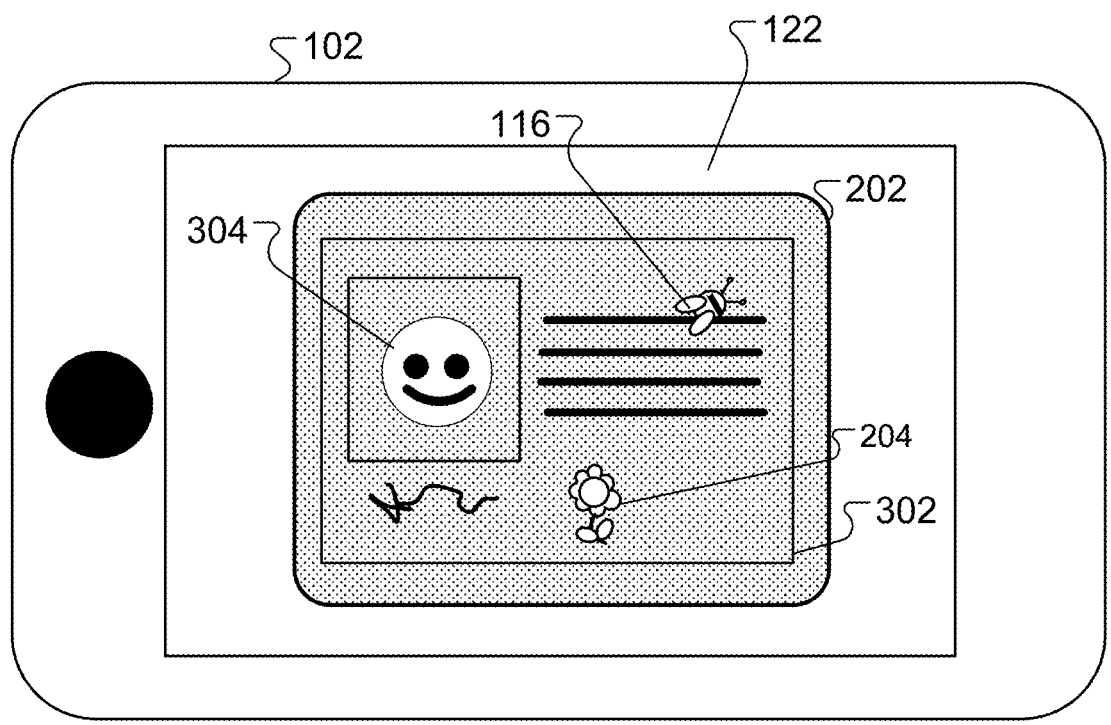

Hence, FIG. 3B illustrates a target 204 that is positioned at a different location within display 122 (e.g., bottom middle of the display) as compared to the position location of the target 204 shown at FIG. 3A (e.g., top left of the display). Application 106 is configured to generate as many new targets 204 as needed to correct one or more error conditions associated with capturing high quality images of an entire ID document 302. In some implementations, application 106 generates a random number of targets for capturing the images and uses programmed instructions to randomize the locations of targets 204 within display 122. Targets 204 can be stationary targets that are captured using tokens 119, moving targets that are captured using the tokens, or a combination of both.

Figure 3C:
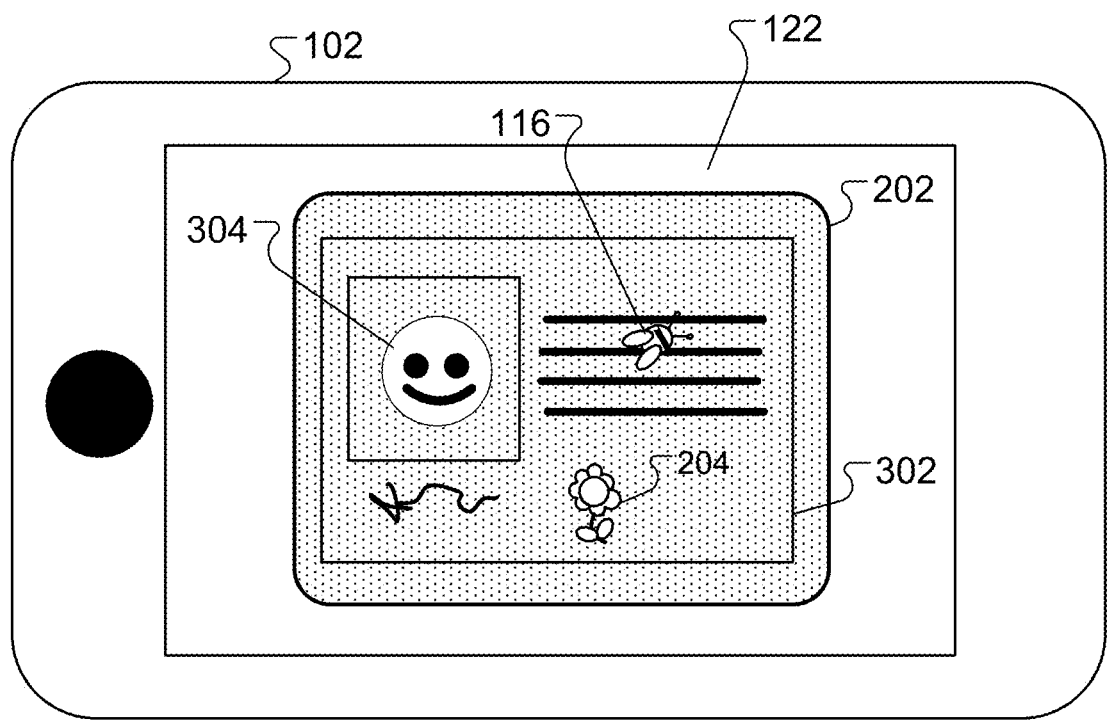

FIG. 3C illustrates an implementation where application 106 determines whether the document 302 is within a predefined capture border 202. In response to determining that document 302 is within capture border 202, application 106 provides a notification for display at user device 102. The notification can include instructions or indications for positioning or repositioning bee token 119 provided for display to the user and at display 122. Application 106 can display a first capture border (e.g., a green border) when the application determines that document 302 is within capture border 202 and display a second/different capture border (e.g., a red border) when the application determines that document 302 is not within capture border 202.

In some implementations, determining whether document 302 is within the predefined capture border 202 includes one of: i) application 106 causing border 202 to have a first characteristic in response to determining that document 302 is within border 202; or ii) application 106 causing border 202 to have a second characteristic in response to determining that document 302 is not within border 202. The second characteristic is different than the first characteristic. For example, the first characteristic can be a particular color, a particular line thickness, a particular line weight, or a particular line pattern/dash arrangement.

Application 106 is configured to determine whether user input at device 102 causes an action that exceeds a certain parameter threshold (e.g., for an attribute value) for ensuring a high quality image capture. Application 106 can provide feedback and other indications for output at display 122 in response to determining that an action exceeds certain parameter values for an image capture. For example, if a user moves user device 102 too close to ID card 302, a size of a capture field is reduced and border 202 can change from a green border to a red border to indicate that the entire ID card 302 is no longer within border 202.

In some implementations, when a parameter threshold is exceeded and border 202 is a red border, movement of bee token 119 can also be disabled. When user device 102 is moved further away from ID card 302 to position the card within border 202, the size of the capture field is enlarged, movement of bee token 119 is once again enabled, and border 202 changes from a red border to a green border. When ID card 302 is once again in the target capture area, token 119 is re-enabled and user device 102 may be tilted/re-oriented to once again move token 119 toward a new target 204 to allow for the capture of additional images of the card. In some implementations, even after multiple high quality images of ID card 302 have been successfully captured, application 106 can still generate and display a number of additional random targets 204.

When movement of token 119 is disabled, application 106 may also execute one or more data verification or data validation checks to ensure that an attempt to spoof an identification document did not occur, or is not occurring. In other implementations, disabled movement of token 119 can be associated with an "error state" that triggers an image capture process to be restarted. When the image capture process is restarted, interactive gaming aspects of the capture process can be resumed when ID card 302 is once again within a target capture area/field.

After restarting a capture process, additional targets 204 are offered to recapture discarded areas of ID card 302. Multiple image targets 204 can be randomly generated over a predefined time period. In some instances, application 106 can generate one or more dummy image targets that are provided for display to the user via user device 122. The dummy image targets can also be randomly generated over the predefined time period. The predefined time period can define a length of time for capturing a certain number of images that are each within threshold ranges for parameter values that correspond to a high quality image. The predefined time period can also define a length of time for displaying one or more dummy targets after a certain number of high quality images have been captured.

In some implementations, application 106 is configured generate a maximum number of targets within a particular time duration and to detect a maximum quantity of error conditions. For example, application 106 can determine that a threshold (or maximum) number of targets 204 has been exceeded, that a predefined time period has expired, or that a particular number of error conditions have occurred. Based on one or more of these determination, application 106 can suspend or disable use of certain interactive features. For example, application 106 can disable generating new tokens 119 or disable generating new targets 204. In some implementations, when interactive features are suspended or disabled, application 106 causes user device 102 to display a "game failed" notification. Further, user device 102 can also display instructions for directing a new course of action (e.g., contact "User Support").

Figure 3D:
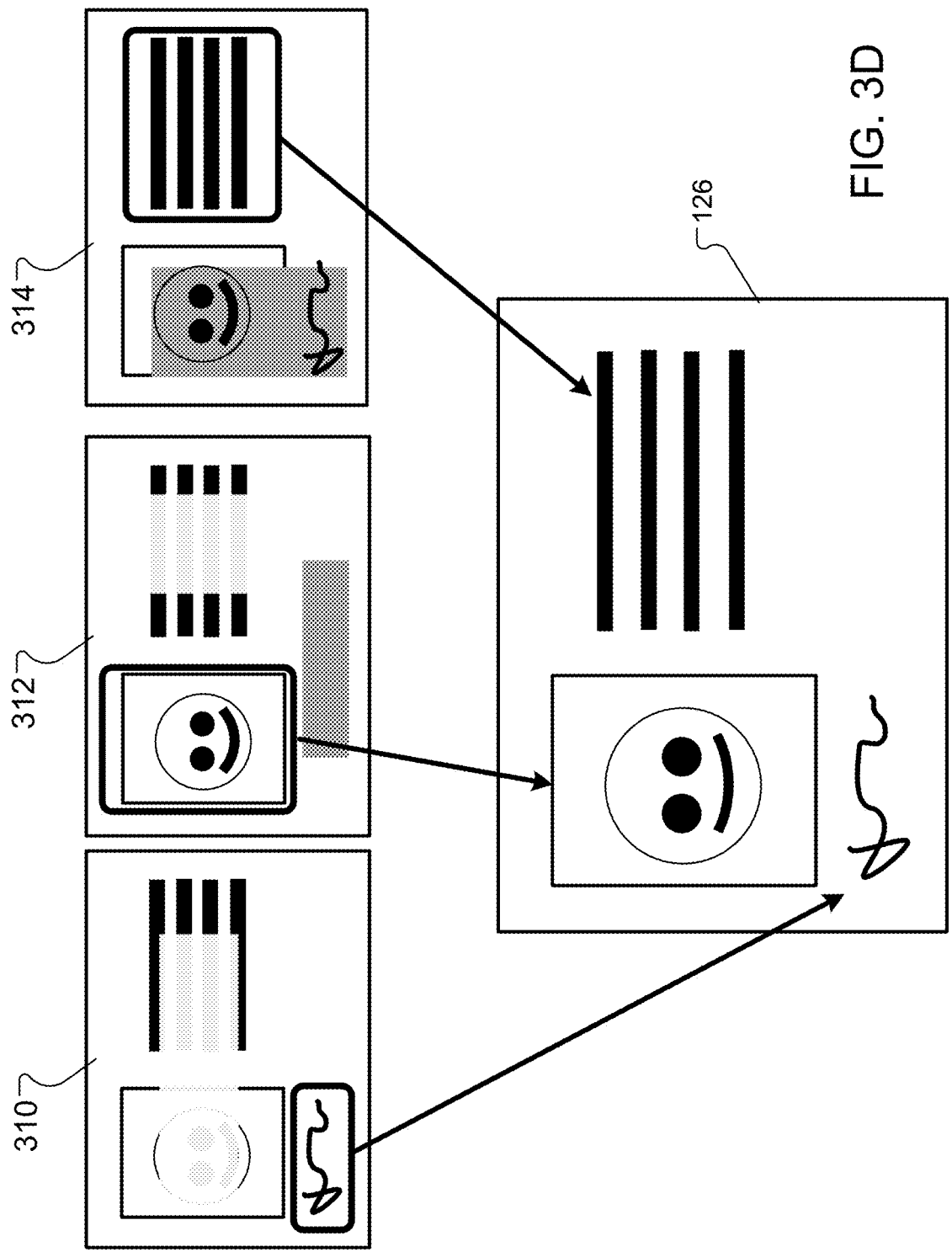
FIG. 3D shows different image data of the document and an example composite image of the document.

FIG. 3D illustrates different image data of document 302 and an example composite image 126 of the document. As indicated above, composite image 126 is generated based on multiple separate images 310, 312, and 314 that are captured during movement of tokens 119 to align with targets 204. For example, moving the token 119 to align with the targets 204 causes image properties, such as shadow and glare on card ID 302, to adjust or change. As properties are changed, image data values for certain attributes are computed and compared to threshold values. When the computed values for certain image properties are below (or above) a particular threshold value, system 100 captures multiple photos (e.g., digital images) of ID card 302. Application 106 can construct or generate a composite of the card 302 to validate the ID card as well as validate or verify identifying information included on ID card 302.

Application 106 can use image generator 116 to extract various features from each image 310, 312, and 314. In some implementations, application 106 extracts distinct features from each image 310, 312, 314 to compile a composite image 126 that meets at least one quality metric associated with image clarity. In some implementations, when the capture process is complete and all randomized targets 204 have been displayed and collected, application 106 can cause user device 102 to display a message informing the user that the image capture process was successful.

Figure 4:
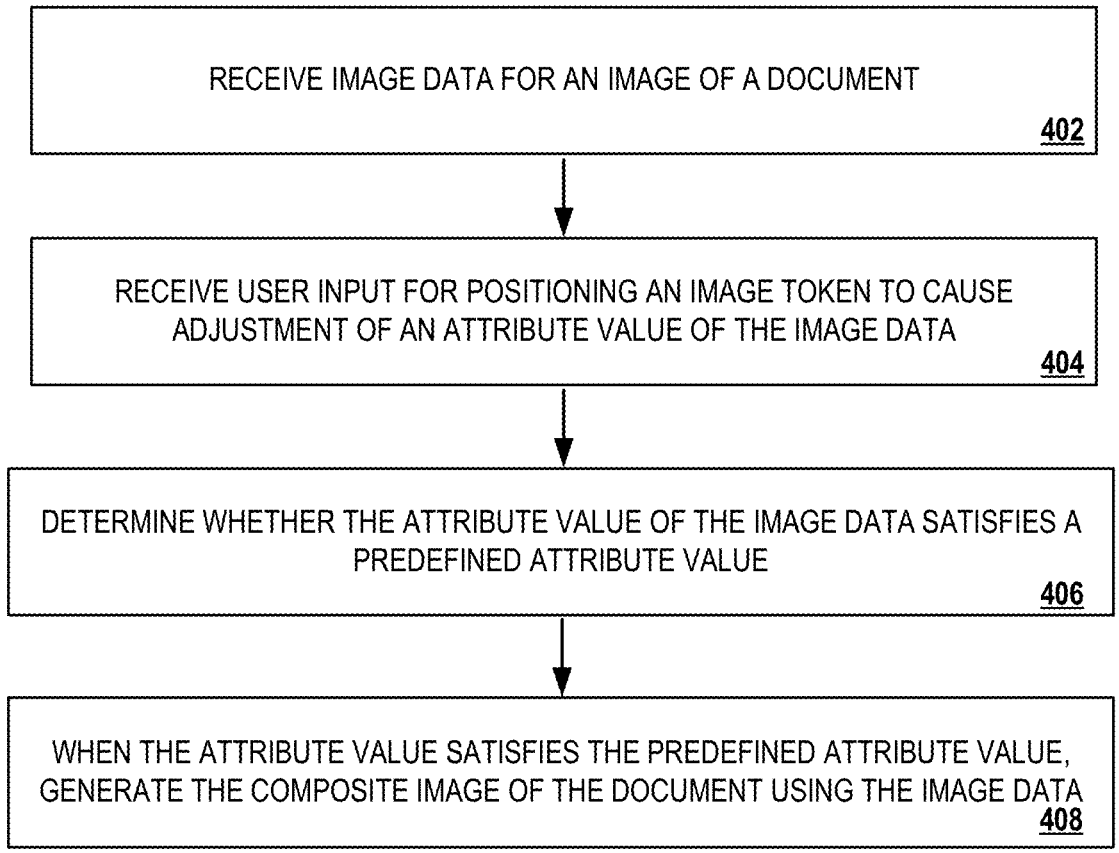
FIG. 4 shows a flow diagram of an example process for generating a composite image of the document using the data capture application.

FIG. 4 shows a flow diagram of an example process 400 for generating a composite image of a document using a data capture application. Process 400 can be implemented or executed using the systems and devices described above. Thus, descriptions of process 400 may reference the above-mentioned computing resources of user device 102 and server 104. In some implementations, the described actions of process 400 are enabled by computing logic or programmed instructions executable by processing devices and memory of computing resources described in this document.

At block 402 of process 400, data capture application 106 receives image data for an image of a document. The image data can be used to capture digital or electronic images and video content of an identification card or ID document, such as document 210 or 302 described above. The captured image or video content can be used to validate authenticity of the document 210. In some implementations, authenticity validation of an identification document 210 may require that relevant information on the document 210 be photographed with minimal glare, reflections, shadows, or other obscurities that can distort information and representations depicted in the captured image content.

At block 404, data capture application 106 receives user input for positioning an image token provided for display to a user of the data capture application 106. Positioning the image token causes adjustment of an attribute value of the image data. For example, the user input corresponds to a tilting action in which a user tilts or adjusts an orientation of user device 102 to align an example token 119, 240 with a target 204, 230. In some implementations, the attribute value can be pixel values that indicate a certain amount glare or reflection at the document 210. In some cases, the generated tokens and targets correspond to notifications that include an instruction to position the image token 240 at a particular location of a display of the user device 102 so as to align the token 240 with a 230.

At block 406 of process 400, the data capture application 106 determines whether the attribute value of the image data satisfies a predefined attribute value. In some implementations, data capture application 106 determines that the attribute value of the image data satisfies the predefined attribute value in response to receiving the user input. For example, the user input indicating tilting or reorienting of the user device 102 causes a corresponding change in how light at the surface of document 210 is received and processed by a camera of user device 102. In this manner, the data capture application 106 uses the image adjustment logic 112 to adjust the attribute value of the image data based on the user input indicating the image token 240 was positioned to align with the image target 230.

At block 408, data capture application 106 generates a composite image of the document using the image data received by the data capture application. Application 106 generates the composite image based on the attribute value satisfying the predefined attribute value. Application 106 uses programmed instructions of image generator 116 to generate the composite image 126. For example, composite image 126 can be generated based on multiple separate images 310, 312, and 314. In some implementations, generating the composite image 126 includes performing multiple image registration. For example, each of the separate images can be registered as meeting a suitable image clarity or quality threshold before the application 106 performs image stitching to generate the composite image 126 by stitching the registered separate images 310, 312, and 314.

Figure 5:
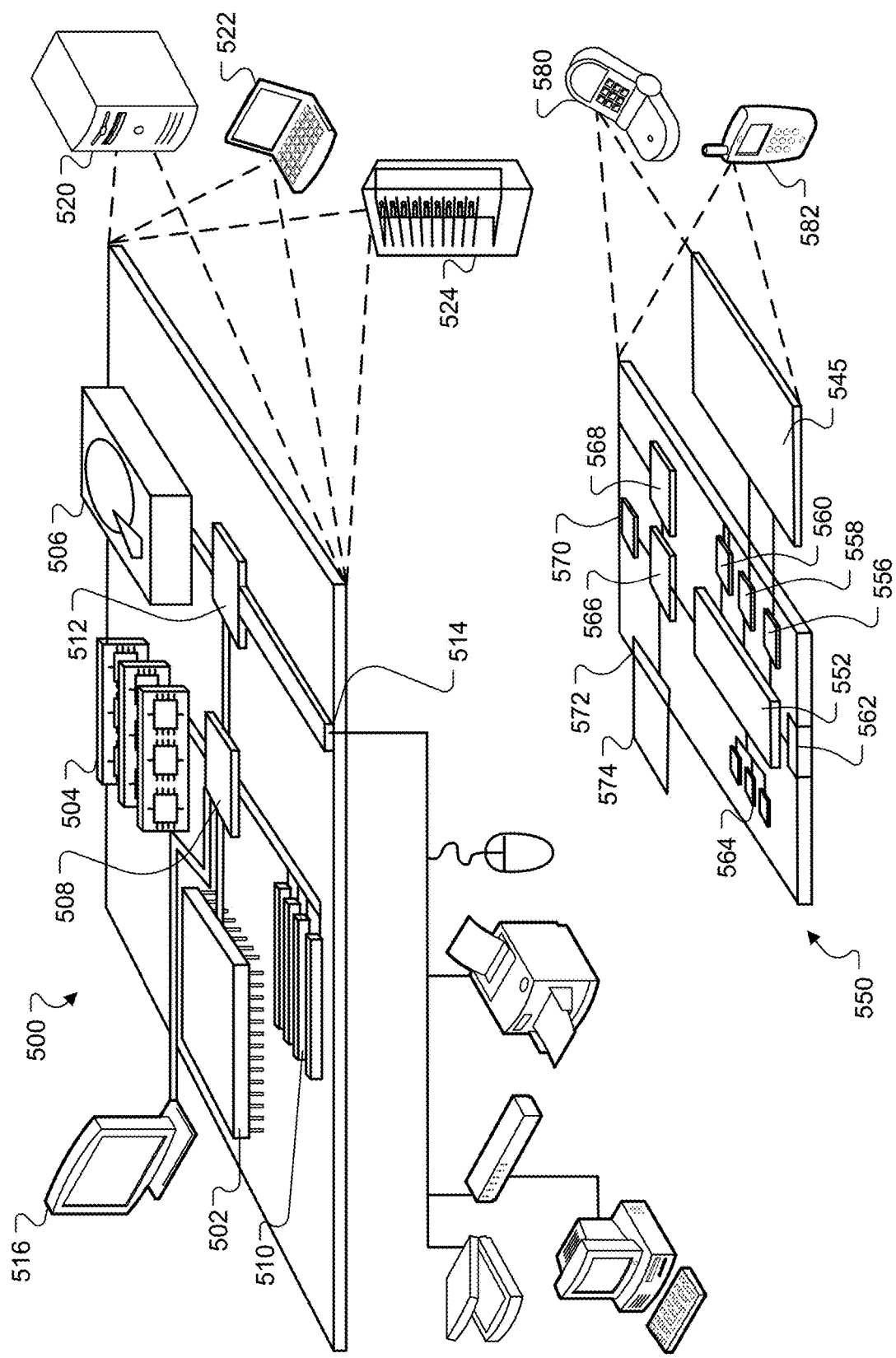
FIG. 5 shows a block diagram of a computing system that can be used in connection with computer-implemented methods described in this specification.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, smartwatches, head-worn devices, and other similar computing devices. The components shown here, their connections and relationships, and their functions, are meant to be exemplary only, and are not meant to limit implementations described and/or claimed in this document.

Computing device 500 includes a processor 502, memory 504, a storage device 506, a high-speed interface 508 connecting to memory 504 and high-speed expansion ports 510, and a low speed interface 512 connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to high speed interface 508. In other implementations, multiple processors and/or multiple buses may be used, as appropriate, along with multiple memories and types of memory. Also, multiple computing devices 500 may be connected, with each device providing portions of the necessary operations, e.g., as a server bank, a group of blade servers, or a multi-processor system.

The memory 504 stores information within the computing device 500. In one implementation, the memory 504 is a computer-readable medium. In one implementation, the memory 504 is a volatile memory unit or units. In another implementation, the memory 504 is a non-volatile memory unit or units.

The storage device 506 is capable of providing mass storage for the computing device 500. In one implementation, the storage device 506 is a computer-readable medium. In various different implementations, the storage device 506 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of duties is exemplary only. In one implementation, the high-speed controller 508 is coupled to memory 504, display 516, e.g., through a graphics processor or accelerator, and to high-speed expansion ports 510, which may accept various expansion cards (not shown). In the implementation, low-speed controller 512 is coupled to storage device 506 and low-speed expansion port 514. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can process instructions for execution within the computing device 550, including instructions stored in the memory 564. The processor may also include separate analog and digital processors. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT LCD display or an OLED display, or other appropriate display technology. The display interface 556 may include appropriate circuitry for driving the display 554 to present graphical and other information to a user. The control interface 558 may receive commands from a user and convert them for submission to the processor 552. In addition, an external interface 562 may be provided in communication with processor 552, so as to enable near area communication of device 550 with other devices. External interface 562 may provide, for example, for wired communication, e.g., via a docking procedure, or for wireless communication, e.g., via Bluetooth or other such technologies.

The memory 564 stores information within the computing device 550. In one implementation, the memory 564 is a computer-readable medium. In one implementation, the memory 564 is a volatile memory unit or units. In another implementation, the memory 564 is a non-volatile memory unit or units. Expansion memory 574 may also be provided and connected to device 550 through expansion interface 572, which may include, for example, a SIMM card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provided as a security module for device 550, and may be programmed with instructions that permit secure use of device 550. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS receiver module 570 may provide additional wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound, e.g., voice messages, music files, etc., and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

In addition, certain data may be treated in one or more ways before it is stored or used, so that personally identifiable information is removed. For example, in some embodiments, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

A number of embodiments have been described. Nevertheless, it will be understood that various modifications may be made without departing from the spirit and scope of the invention. Accordingly, other embodiments are within the scope of the following claims. While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment.

Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, some processes depicted in the accompanying figures do not necessarily require the particular order shown, or sequential order, to achieve desirable results.

What is claimed is:

1. A computer-implemented method comprising:
generating, by a data capture application, an image token as an overlay to an image of an identification document;
detecting, by the data capture application, a respective error condition representing pixel oversaturation at different areas of the image as the image is displayed at a computing device;
positioning the image token relative to each of the different areas of the image that corresponds to the respective error condition, the positioning being in response to detection of a plurality of user inputs at the computing device;
correcting, using the data capture application, each respective error condition by adjusting pixel values of the image based on the positioning of the image token relative to each of the different areas of the image; and
generating a composite image of the identification document after correcting each of the respective error conditions.

2. The method of claim 1, further comprising:
generating, by the data capture application, a notification to position the image token at a particular location of a display of the computing device; and
providing, by the data capture application, the notification as a display output to a user of the data capture application to cause the user to position the image token at the particular location.

3. The method of claim 2, further comprising:
generating, by the data capture application, a predefined capture border provided as a display output to the user of the data capture application and that is operable to cause the user to orient the computing device to position a representation of the identification document displayed at the computing device within the predefined capture border;
determining, by the data capture application, whether the representation of the identification document is within the predefined capture border; and
in response to determining that the representation of the identification document is within the predefined capture border, providing the notification as the display output.

4. The method of claim 3, wherein determining whether the representation of the identification document is within the predefined capture border comprises:
causing, by the data capture application, the predefined capture border to have a first characteristic in response to determining that the representation of the identification document is within the predefined capture border; and
causing, by the data capture application, the predefined capture border to have a second different characteristic in response to determining that a portion of the representation of the identification document is outside of the predefined capture border.

5. The method of claim 2, wherein the notification:
i) instructs the user to adjust an orientation of the computing device; and
ii) instructs the user to adjust a tilt angle of the computing device.

6. The method of claim 2, wherein:
i) the image token is a first image overlay feature of the data capture application; and
ii) the image token is operable to move over the image of the identification document when the image of the identification document is provided for display at the computing device.

7. The method of claim 6, further comprising:
generating, by a target generator of the device capture application, an image target that is provided as a display output to the user of the data capture application, wherein the image target is randomly generated over a predefined time period.

8. The method of claim 7, further comprising:
i) detecting that the image token is aligned with the image target generated by the data capture application based on each of the plurality of user inputs; and
ii) wherein the image target is a second image overlay feature of the data capture application.

9. The method of claim 7, further comprising:
adjusting, by the data capture application, the attribute value of the image data based on user input indicating the image token was positioned to align with the image target.

10. The method of claim 1, wherein the pixel values correspond to at least one of a plurality of image attributes that are descriptive of the image of the identification document.

11. The method of claim 10, wherein the plurality of attributes comprise at least one of:
i) a glare attribute of the image;
ii) a clarity attribute of the image;
iii) a shadow attribute of the image; or
iv) a distance attribute of the image.

12. A computing system, comprising:
one or more processing devices; and
one or more non-transitory machine-readable storage devices storing instructions that are executable by the one or more processing devices to cause performance of operations comprising:
generating, by a data capture application, an image token as an overlay to an image of an identification document;
detecting, by the data capture application, a respective error condition representing pixel oversaturation at different areas of the image as the image is displayed at a computing device;
positioning the image token relative to each of the different areas of the image that corresponds to the respective error condition, the positioning being in response to detection of a plurality of user inputs at the computing device;
correcting, using the data capture application, each respective error condition by adjusting pixel values of the image based on the positioning of the image token relative to each of the different areas of the image; and
generating a composite image of the identification document after correcting each of the respective error conditions.

13. The computing system of claim 12, wherein the operations further comprise:

generating, by the data capture application, a notification to position the image token at a particular location of a display of the computing device; and providing, by the data capture application, the notification as a display output to a user of the data capture application to cause the user to position the image token at the particular location.

14. The computing system of claim 13, wherein the operations further comprise:

generating, by the data capture application, a predefined capture border provided as a display output to the user of the data capture application and that is operable to cause the user to orient the computing device to position a representation of the identification document displayed at the computing device within the predefined capture border;

determining, by the data capture application, whether the representation of the identification document is within the predefined capture border; and in response to determining that the representation of the identification document is within the predefined capture border, providing the notification as the display output.

15. The computing system of claim 14, wherein determining whether the representation of the identification document is within the predefined capture border comprises:

causing, by the data capture application, the predefined capture border to have a first characteristic in response to determining that the representation of the identification document is within the predefined capture border; and causing, by the data capture application, the predefined capture border to have a second different characteristic in response to determining that a portion of the representation of the identification document is outside of the predefined capture border.

16. The computing system of claim 13, wherein the notification:

i) instructs the user to adjust an orientation of the computing device; and ii) instructs the user to adjust a tilt angle of the computing device.

17. The computing system of claim 13, wherein:

i) the image token is a first image overlay feature of the data capture application; and ii) the image token is operable to move over the image of the identification document when the image of the identification document is provided for display at the computing device.

18. The computing system of claim 17, wherein the operations further comprise:

generating, by a target generator of the device capture application, an image target that is provided as a display output to the user of the data capture application, wherein the image target is randomly generated over a predefined time period.

19. The computing system of claim 17, wherein the operations further comprise:

i) detecting that the image token is aligned with the image target generated by the data capture application based on each of the plurality of user inputs; and ii) wherein the image target is a second image overlay feature of the data capture application.

20. The computing system of claim 19, wherein the operations further comprise:

adjusting, by the data capture application, the attribute value of the image data based on user input indicating the image token was positioned to align with the image target.

21. The computing system of claim 12, wherein the pixel values correspond to at least one of a plurality of image attributes that are descriptive of the image of the identification document.

22. The computing system of claim 21, wherein the plurality of attributes comprise at least one of:

i) a glare attribute of the image;

ii) a clarity attribute of the image;

iii) a shadow attribute of the image; or iv) a distance attribute of the image.

23. One or more non-transitory machine-readable storage devices for storing instructions that are executable by one or more processing devices to cause performance of operations comprising:

generating, by a data capture application, an image token as an overlay to an image of an identification document;

detecting, by the data capture application, a respective error condition representing pixel oversaturation at different areas of the image as the image is displayed at a computing device;

positioning the image token relative to each of the different areas of the image that corresponds to the respective error condition, the positioning being in response to detection of a plurality of user inputs at the computing device;

correcting, using the data capture application, each respective error condition by adjusting pixel values of the image based on the positioning of the image token relative to each of the different areas of the image; and generating a composite image of the identification document after correcting each of the respective error conditions.

* * * * *